UNITED STATES PATENT OFFICE.

SAMUEL M. COBURN, OF HARFORD COUNTY, MARYLAND.

IMPROVEMENT IN COMPOSITIONS FOR PREVENTING MILDEW IN NETS, &c.

Specification forming part of Letters Patent No. 153,476, dated July 28, 1874; application filed June 30, 1874.

*To all whom it may concern:*

Be it known that I, SAMUEL M. COBURN, of the county of Harford and State of Maryland, have invented certain new and useful Improvements in Composition for Preserving Nets, &c., from Mildew and Rot; and I do hereby declare that the following is a full, clear, and exact description thereof, which will enable others skilled in the art to which it pertains to make and use the same.

My invention relates to a composition for preserving nets, fishing-lines, rigging, and other articles exposed to the weather from mildew and rot; and consists in a mixture of linseed-oil, tar, and spirits of turpentine in about the following proportions:

For a light dressing of the articles to be treated, tar, (gas or pine,) one part; spirits of turpentine, one part; linseed-oil, (raw,) one part.

For a heavy dressing, tar, (gas or pine,) two parts; spirits of turpentine, one part; linseed-oil, (raw,) one part.

Whether a light or heavy dressing is used depends upon the article to be treated, and the use for which it is intended. For small articles—fine nets and lines, for instance, which are housed carefully when not in use—the light dressing is sufficient; but for rigging and all heavy articles, or such as are exposed continuously to the weather, the heavy dressing is preferable.

I prepare my composition as follows: I first place in a suitable vessel, such as a tub, barrel, or tank, the proper quantity of tar, and add the turpentine, stirring briskly, and immediately adding the linseed-oil, and continuing to stir briskly until the whole mass is thoroughly mixed.

Articles to which my composition is to be applied are dipped into it and thoroughly saturated, after which they should be passed between rollers similar to clothes-wringers, or be otherwise deprived of surplus composition.

Fishing-nets should be treated yearly, and will usually last five times as long as they would if left untreated. The same with lines. Rigging should be occasionally inspected, and kept supplied with the composition, as should the various other articles to which it is applicable.

Having now described my composition, and explained the best manner, as I believe, of preparing and using the same, I claim, and desire to secure by Letters Patent—

The herein-described composition, consisting of tar, (gas or pine,) spirits of turpentine, and linseed-oil, (raw,) in substantially the proportions named, and for the purpose set forth.

In testimony that I claim the foregoing as my own invention, I affix hereto my signature in presence of two witnesses.

SAMUEL M. COBURN.

Witnesses:
 HOMER RIGGS,
 WM. BEALE HALE.